United States Patent [19]
DeMasters

[11] Patent Number: 6,021,817
[45] Date of Patent: Feb. 8, 2000

[54] MULTI-LAYER PLASTIC HELICAL PIPE AND METHOD FOR THE PRODUCTION THEREOF

[75] Inventor: Jimmie G. DeMasters, Wylie, Tex.

[73] Assignee: Phillips Petroleum Company, Bartlesville, Okla.

[21] Appl. No.: 08/320,016

[22] Filed: Oct. 7, 1994

[51] Int. Cl.[7] ..................................................... F16L 9/133
[52] U.S. Cl. ..................... 138/144; 138/154; 138/DIG. 7
[58] Field of Search ..................................... 138/144, 137, 138/141, 154, DIG. 7

[56] References Cited

U.S. PATENT DOCUMENTS

| | | | |
|---|---|---|---|
| 3,491,799 | 1/1970 | Foll | 138/144 |
| 3,917,500 | 11/1975 | Petzetakis et al. | 156/195 |
| 4,014,370 | 3/1977 | McNulty | 138/141 |
| 4,213,487 | 7/1980 | Funk et al. | 138/149 |
| 4,265,693 | 5/1981 | Nishimoto et al. | 156/218 |
| 4,312,902 | 1/1982 | Murase et al. | 138/145 |
| 4,353,763 | 10/1982 | Simons | 138/DIG. 3 |
| 4,523,613 | 6/1985 | Fouss et al. | 138/121 |
| 4,824,502 | 4/1989 | Nagayoshi et al. | 138/154 |
| 5,190,815 | 3/1993 | Kobayashi et al. | 138/DIG. 7 |
| 5,299,885 | 4/1994 | Prassas et al. | 138/DIG. 7 |
| 5,414,489 | 5/1995 | Kaplan | 355/67 |

*Primary Examiner*—Andres Kashnikow
*Assistant Examiner*—James F. Hook
*Attorney, Agent, or Firm*—Ryan N. Cross

[57] ABSTRACT

A method of producing large-diameter helical pipes for plastic synthetic resins wherein the pipe has an outer layer comprised of a first plastic resin and an inner layer comprised of a second plastic resin. In a particularly preferred embodiment, a helical pipe having an outer layer which is an ultraviolet light-protective color and an inner plastic layer which is a light-reflecting color is provided.

4 Claims, 2 Drawing Sheets

MULTI-LAYER PLASTIC HELICAL PIPE AND METHOD FOR THE PRODUCTION THEREOF

BACKGROUND OF THE INVENTION

This invention relates to the production of a large diameter multi-layer plastic pipe from helically coiled plastic strips. More particularly, this invention relates to the production of such pipes which have an ultraviolet light-protecting outer surface and light-reflecting inner surface.

Production of plastic pipes by helical-seam techniques have gained increasing interest. For example, a plastic strip can be fed tangentially to a cylindrical mandrel at an angle to the axis thereof so that the strip is coiled in a multiplicity of successive turns on the mandrel with confronting edges of the successive turns being bonded together.

Generally, helical-seam techniques have been used to produce large diameter plastic pipes, (e.g., generally from about 0.5 meters to about 3 meters in diameter) such as sewage, water pipes, or the like and including maintenance holes or manholes which give access to such pipes. Once such pipes are in use, it is in many cases required that a utility or surface inspection thereof include a visual or video viewing and/or a video recording of the interior of the pipe. Traditionally, such pipes have been made utilizing a black, high density polyethylene (HDPE) because of the black HDPE pipe's excellent resistance to deterioration due to ultraviolet light. However, the black interior of the black HDPE pipe makes it unsuitable for video inspection of the interior due to light absorption properties of the black color.

SUMMARY OF THE INVENTION

It is, therefore, an object of the present invention to provide a pipe or maintenance hole which has an interior suitable for video inspection and yet is resistant to deterioration caused by ultraviolet light.

It is a further object of the present invention to provide a method of producing such a pipe.

The above objects are realized in a helical pipe comprising an outer plastic layer and an inner plastic layer wherein the outer plastic layer is an ultraviolet light-protective color and the inner plastic layer is a light-reflecting color.

According to one aspect of the invention, there is provided a method of making a multi-layer helical pipe. The method comprises the steps of extruding a first plastic strip having a pair of lateral flanks, extruding a second plastic strip having a pair of lateral flanks, helically coiling the first plastic strip and the second plastic strip such that the resulting helically coiled second plastic strip is interior to and adjacent to the coil of the first plastic strip, thermally bonding the first plastic strip to the second plastic strip and thermally bonding the adjacent turns of each coil together at their lateral flanks to form a multi-layer helical plastic pipe with the first plastic strip forming the outer layer of the pipe and the second plastic strip forming the inner layer of the pipe.

DETAILED DESCRIPTION OF THE INVENTION

As used herein, the term helical pipe refers to pipes and/or maintenance holes produced by helical-seam techniques such as the method described below. Generally, these pipes will be large diameter pipes, typically, from about 0.5 meters to about 3.0 meters, more preferably from about 1.25 meters to about 2.75 meters, and most preferably from 1.3 meters to 2.5 meters in diameter.

Referring now to the Figures, the apparatus shown is designed to produce a large diameter tube, such as a pipe, duct, vessel, container, or maintenance hole, having a cylindrical configuration and composed of a plastic synthetic resin such as polyvinylchloride, polyethylene or any of the other plastic materials commonly used in the formation of extruded pipe.

Figure 1:
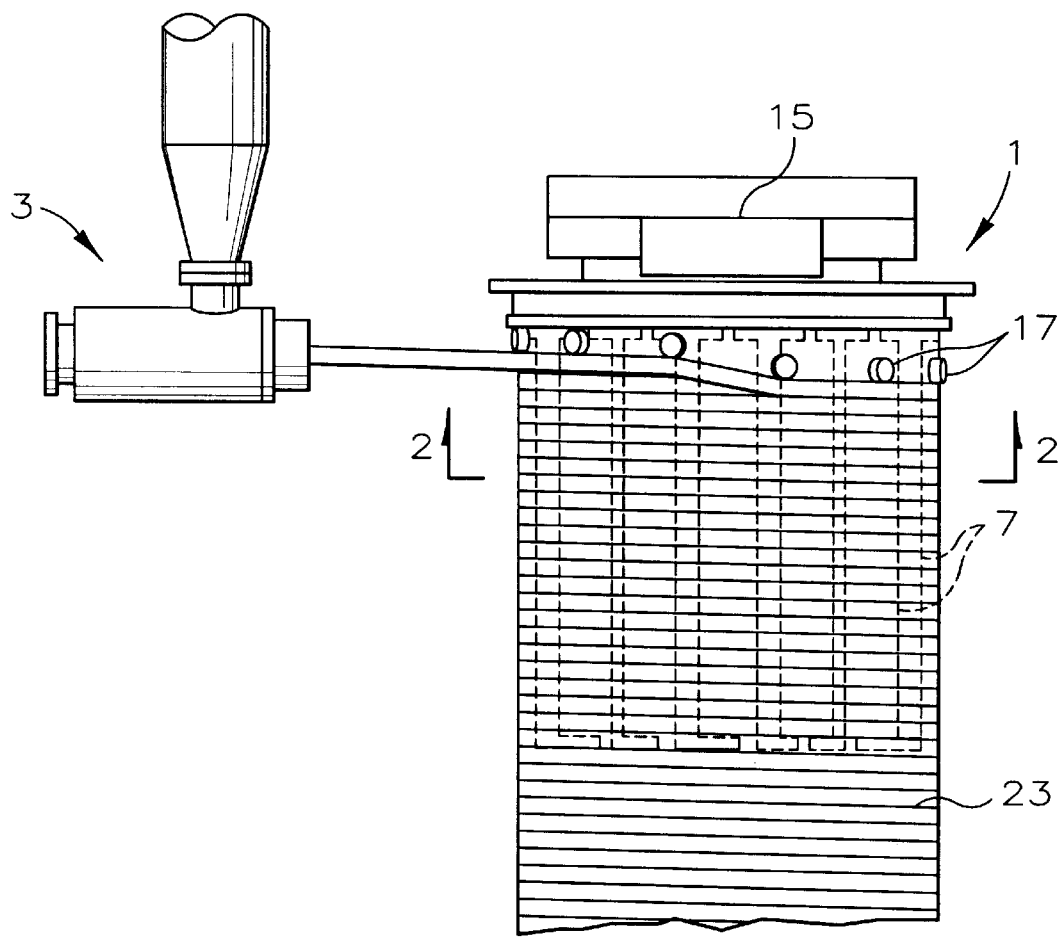
FIG. 1 is a view, partly in diagrammatic form, of an apparatus for carrying out the process of the present invention.
Figure 2:
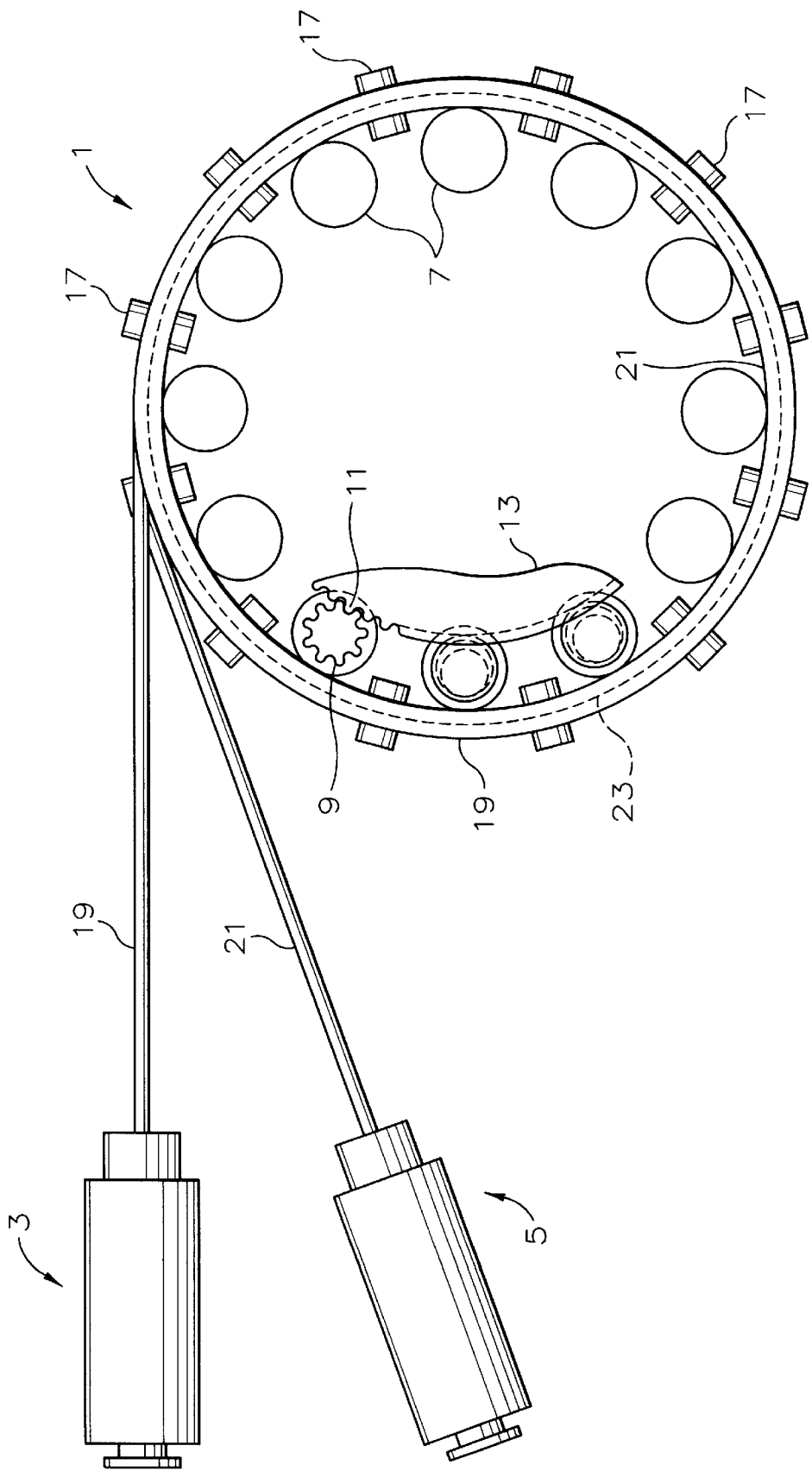
FIG. 2 is a cross-sectional view taken along the line 2—2 of FIG. 1 but drawn to a larger scale.

Referring now to FIG. 1, the apparatus basically comprises a tube-coil machine 1, a first synthetic resin extruder 3 (for one or more resins), a second synthetic resin extruder 5 (which can be seen in FIG. 2). First extruder 3 and second extruder 5 can be chosen from either dynamic or screw-type extruders.

The coiling machine 1 comprises, as can be more clearly seen from FIG. 2, a coiling core provided in the form of a plurality of angularly, equal-spaced circumferentially disposed rollers 7 which are synchronously driven. To this end, each of the rollers 7 has a pinion 9 meshing with the common sun wheel 11 of the synchronous drive 15 (FIG. 1). Consequently, all the rollers 7 are driven in a clockwise sense as the sun wheel 11 is driven in a counter-clockwise sense by a motor 15. Coiling machine 1 further comprises radially extending rollers 17 which apply axial pressure to the plastic strip helically coiled around circumferentially disposed rollers 7.

In operation, a first plastic material is supplied to extruder 3 and a second plastic material is supplied to extruder 5. From the first plastic material, first extruder 3 produces a first extruded plastic strip 19 which is introduced to tube-coiling machine 1. Preferably, the first extruded plastic strip 19 is introduced to tube-coiling machine 1 in a substantially solid state but still retaining sufficient heat to allow it to be welded to other similarly heated plastic materials without any substantial heating. Similarly, the second plastic material introduced into second extruder 5 is extruded to form a second extruded plastic strip 21 which is introduced to tube-coiling machine 1. If necessary, additional heating means may be provided prior to introduction of the plastic strips to the tube-coiling machine to bring the first extruded plastic strip 19 and the second extruded plastic strip 21 to fusion temperature. Additionally, a guide means can be added prior to the introduction of the plastic strips to tube-coiling machine 1 in order to insure a proper alignment of the plastic strips upon introduction to tube-coiling machine 1.

The first and second extruded plastic strips should be introduced into tube-coiling machine 1 such that as the strips are helically coiled about circumferentially disposed rollers 7, the second strip lies adjacent to the first strip and within the radius of the first strip, and the lateral flanks of the second strip are adjacent to and inside the lateral flanks of the first strip.

As the plastic strips are introduced into the tube-coiling machine they are helically coiled around the circumferentially disposed rollers 7 and the lateral flanks of the turns are butt-welded to form the large diameter helical pipe. Motor 15 which drives sun wheel 11, and, thus, the pinions 9, causes the circumferentially disposed rollers 7 to turn, which in turn rotate the turns of the first and second plastic strips 19 and 21 creating the helical wrapping of the strips about circumferentially disposed rollers 7. The rollers 7 are shown in dot-dash lines in FIG. 1 and can be seen to be parallel to the axis of the coiling machine although it is also possible to have them inclined slightly towards the axis of the machine in the direction of their pipe-discharge ends. The rollers 7, at their turn-disposition ends, are formed with smooth steel peripheries with a low coefficient of sliding friction, while at their pipe-discharge ends they are formed with braking sheaths of rubber or other material having a high coefficient of friction. Thus, just as the pipe tends to move off the array of rollers 7 a retarding force is frictionally introduced between the rollers 7 and the completed coil or pipe 23. During the winding of the strips 19 and 21 about the rollers 7 sufficient pressure is applied between the strips by the winding action to fuse the first plastic strip to the second plastic strip. Additionally, radially extending rollers 17 apply axial pressure which is aided by the retarding force which is frictionally introduced between rollers 7 and the completed coil or pipe 23 so that the abutting lateral flanks between adjacent turns are fused together. The radially extending rollers 17 can be replaced by pressure fingers without deviating from the principal of the present invention which requires only that as the incoming strips 19 and 21 meet the previously formed turn of helically-seam pipe there is sufficient lateral and axial force to effect the bonding.

As noted previously, the lateral faces of the strip as it emerges from the extruder retains sufficient heat to effect bonding under the axial pressure corresponding to the downward force applied by the radial extending rollers 17 and the retarding force frictionally introduced between the rollers 7 and the completed pipe 23. Additionally, the strips 19 and 21 should retain sufficient heat to effect the bonding of the first strip to the second strip under the radial pressure created by the wrapping of the strips about the circumferentially disposed rollers 7.

The resulting helical pipe will comprise an outer plastic layer formed from the first plastic strip 19 and an inner plastic layer formed from the second plastic strip 21. While the outer plastic layer has been referred to as being formed from a first plastic strip, it should be understood that generally, the first plastic strip is in the form of a hollow-profile having a generally rectangular external cross-section and a generally round inner cross-section. Additionally, while the inner layer could be any suitable plastic strip, it is generally preferred that it have the form of a film typically from about 5 to about 15 mils thick. In a preferred embodiment, the assembly is used to produce a plastic pipe having an outer layer that is an ultraviolet light-protective color and an inner plastic layer that is a light-reflecting color. By ultraviolet light-protective color it is meant that the plastic layer has a color and composition sufficient to prevent or retard the deterioration of the plastic layer upon exposure to ultraviolet light. Particularly preferred is a black plastic layer because of its excellent UV protection. By light-reflecting color it is meant that the color is light enough to provide adequate reflection of light to allow accurate visual or video inspection of the inside of the pipe. It has been found the addition of titanium dioxide to the plastic resin introduced into extruder 5 can be used to provide a usable light-reflecting color.

While any suitable plastic or combination of plastic can be used in the die assembly and can be used to produce the preferred pipe described above, it is presently preferred to use polyethylene as the plastic for the two layers. More preferably, the plastic would be those plastics known as high density polyethylene (HDPE). In a particularly preferred embodiment the resulting pipe will have an outer layer comprising black high density polyethylene and an inner layer comprised of high density polyethylene and titanium dioxide ($TO_2$). While the titanium dioxide can be added in any suitable amount that will increase the reflectiveness for viewing, it is presently preferred that the titanium dioxide be present in an amount of about 0.25 to about 0.50 weight percent based on the total weight of the plastic composition of the inner layer. Although the addition of titanium dioxide will insure a sufficiently reflective color for viewing it has been found that the resulting white surface creates a glare, thus, in an even more preferred embodiment, a small amount of carbon black, preferably less than about 0.25 weight percent based on the total weight of the inner layer, is added to the plastic composition in order to create a light grey color. The resulting HDPE/$TO_2$/carbon black composition has a sufficiently light-reflecting color to allow viewing but reduces the amount of glare so that the reflective light does not interfere with viewing.

While specific structures have been set forth herein, it is to be understood that the variations, equivalences and modifications thereof will be apparent to one skilled in the art and the invention is to be limited only in accordance with the claims.

That which is claimed:

1. A helical pipe comprising an outer plastic layer and an inner plastic layer wherein said outer plastic layer is comprised of polyethylene having a composition sufficient to retard the deterioration of the outer plastic layer upon exposure to ultraviolet light and wherein the inner plastic layer is comprised of polyethylene and about 0.25 to about 0.50 weight percent titanium dioxide and less than about 0.25 weight percent carbon black based on the total composition of said inner plastic layer such that the interior of said helical pipe can be accurately inspected by visual or video means.

2. A helical pipe according to claim 1 wherein said plastic pipe has a diameter from about 0.5 meters to about 3.0 meters.

3. A helical pipe according to claim 1 wherein said plastic pipe has a diameter from about 1.25 meters to about 2.75 meters.

4. A helical pipe according to claim 1 wherein said plastic pipe has a diameter from 1.3 meters to 2.5 meters.

* * * * *